United States Patent
Zinner

(10) Patent No.: US 12,021,833 B2
(45) Date of Patent: Jun. 25, 2024

(54) NETWORK INTERFACE PROTECTED AGAINST ATTACKS

(71) Applicant: Continental Automotive GmbH, Hannover (DE)

(72) Inventor: Helge Zinner, Schwalbach a. Ts (DE)

(73) Assignee: Continental Automotive GmbH, Munich (DE)

( * ) Notice: Subject to any disclaimer, the term of this patent is extended or adjusted under 35 U.S.C. 154(b) by 509 days.

(21) Appl. No.: 17/268,569

(22) PCT Filed: Aug. 16, 2019

(86) PCT No.: PCT/EP2019/071989
§ 371 (c)(1),
(2) Date: Feb. 15, 2021

(87) PCT Pub. No.: WO2020/035584
PCT Pub. Date: Feb. 20, 2020

(65) Prior Publication Data
US 2021/0168120 A1  Jun. 3, 2021

(30) Foreign Application Priority Data
Aug. 17, 2018 (DE) ..................... 10 2018 213 902.4

(51) Int. Cl.
*H04L 9/40* (2022.01)
*H04L 9/08* (2006.01)
(Continued)

(52) U.S. Cl.
CPC .......... *H04L 63/0227* (2013.01); *H04L 9/085* (2013.01); *H04L 9/30* (2013.01);
(Continued)

(58) Field of Classification Search
CPC ..... H04L 9/30; H04L 63/162; H04L 63/0227; H04L 63/08; H04L 9/085; H04L 67/12; H04L 67/62; H04L 2209/84
(Continued)

(56) References Cited

U.S. PATENT DOCUMENTS 9,264,366 B2 *  2/2016  Boucher .................. H04L 67/34
9,646,439 B2 *  5/2017  Ricci ...................... H04W 36/34
(Continued)

FOREIGN PATENT DOCUMENTS

CN        1874303 A     12/2006
CN      103688268 A      3/2014
(Continued)

OTHER PUBLICATIONS

Office Action dated Sep. 5, 2022 from corresponding Chinese patent application No. 201980054060.2.
(Continued)

*Primary Examiner* — Benjamin A Kaplan

(57) ABSTRACT

A network interface has an input port, which is designed to accept messages from a first device or first network, and an output port, which is designed to forward the messages to a second device or second network. A memory is provided for a timetable. The network interface is designed to forward messages arriving at the input port during open times defined by the timetable to the output port and to discard messages arriving at the input port during closed times defined by the timetable. A configuration unit is designed to accept and store in the memory a timetable defined by a monitoring unit as a shared secret for the network interface and at least one sender of messages, and/or to negotiate a timetable with at least one sender of messages as a shared secret.

13 Claims, 3 Drawing Sheets

(51) Int. Cl.
*H04L 9/30* (2006.01)
*H04L 67/12* (2022.01)

(52) U.S. Cl.
CPC .............. *H04L 63/08* (2013.01); *H04L 67/12* (2013.01); *H04L 2209/84* (2013.01)

(58) Field of Classification Search
USPC ......................................................... 726/11
See application file for complete search history.

(56) References Cited

U.S. PATENT DOCUMENTS

| | | |
|---|---|---|
| 2004/0028047 A1 | 2/2004 | Hou et al. |
| 2005/0220017 A1 | 10/2005 | Brand et al. |
| 2010/0036911 A1 | 2/2010 | Sankaran |
| 2011/0066854 A1 | 3/2011 | Poledna et al. |
| 2013/0227650 A1 | 8/2013 | Miyake |
| 2014/0142781 A1 | 5/2014 | Becker |
| 2017/0134937 A1 | 5/2017 | Miller et al. |
| 2017/0142675 A1 | 5/2017 | Ljung |
| 2017/0272366 A1 | 9/2017 | Bush |
| 2018/0007076 A1 | 1/2018 | Galula et al. |
| 2019/0316921 A1 | 10/2019 | Osawa |

FOREIGN PATENT DOCUMENTS

| | | |
|---|---|---|
| CN | 106161451 A | 11/2016 |
| CN | 107431348 A | 12/2017 |
| CN | 107453863 A | 12/2017 |
| CN | 108173755 A | 6/2018 |
| CN | 108352943 A | 7/2018 |
| DE | 10225550 A1 | 12/2003 |
| EP | 3166255 A1 | 5/2017 |
| WO | 2009/121087 A1 | 10/2009 |
| WO | 2011069096 A2 | 6/2011 |
| WO | 2014158766 A1 | 10/2014 |
| WO | 2018127968 A1 | 7/2018 |

OTHER PUBLICATIONS

Hong Fan et al. "Timed-Release, an Extension Logic of Timed-Release Public Key Protocols Analysis", Chinese Journal of Computers, vol. 26, No. 7, Jul. 2003.
"Ethernet-Standard-Familie IEEE 802.1 TSN", IEEE Standards Association, Bridged and Bridged Networks, Amendment 25: Enhandements for Scheduled Traffic, IEEE, 2015.
Office Action dated Mar. 27, 2023 from corresponding Chinese patent application No. 201980054060.2.
"Bridges and Bridged Networks Amendment 25: Enhancements for Scheduled Traffic", IEEE SA-Standards Board, 2015, IEEE, New York, New York, USA.
Office Action dated Jun. 27, 2019 from corresponding German Patent Application No. DE 10 2018 213 902.4.
International Search Report and Written Opinion dated Dec. 16, 2019 from corresponding International Patent Application No. PCT/EP2019/071989.
Notice of Allowance dated Jul. 27, 2023 from corresponding Chinese patent application No. 201980054060.2.

* cited by examiner

NETWORK INTERFACE PROTECTED AGAINST ATTACKS

BACKGROUND

The invention relates to a network interface that is particularly well protected against the unauthorized infiltration of messages and is therefore particularly suitable for Ethernet networks in vehicles.

For the interconnection of control units, sensors, and actuators in a vehicle, networks have long been used instead of individual point-to-point connections, in order to save costs and weight for the wiring. For this purpose, bus systems such as CAN, MOST, and FlexRay are most commonly used. It is also desirable in the future to use Ethernet, which has established itself as the most common standard for networks outside of vehicles.

A great advantage of such networks is that in principle every device can be reached from anywhere in the network. The downside is that network faults can also propagate and, for example, due to sheer overloading of the network a seemingly harmless malfunction can develop into a critical problem, because critical messages for vehicle safety can no longer be transported on time. EP 3 166 255 A1 therefore discloses a method for processing time-critical traffic on a network in which data packets received outside a previously allocated period of time are discarded without their content being viewed. This ensures that data items arriving at the wrong time do not interfere with the transmission of other important data.

BRIEF SUMMARY

The invention provides a network interface. This network interface has an input port that is designed to accept messages from a first device or first network. This network interface also has an output port that is designed to forward messages to a second device or second network. For example, the network interface can thus be installed in a control unit, sensor, or actuator to connect these components to a vehicle network. However, the network interface can also be installed in a device of the network infrastructure, such as a switch or router.

The network interface also comprises a memory for a timetable and is designed to forward messages arriving at the input port during open times defined by the timetable to the outbound port and to discard messages arriving at the input port during closed times defined by the timetable.

In addition, a configuration unit is provided, which is designed to accept and store in memory a timetable, defined by a monitoring unit as a shared secret for the network interface and at least one sender of messages, and/or to negotiate a timetable with at least one sender of messages as a shared secret.

In particular, the term "shared secret" means that the timetable is not generally known in the network and that the time proportions of the open and closed times are selected so as to make it sufficiently unlikely that the timetable or an open time contained therein can be discovered simply by trial and error. For example, if every odd second (or millisecond) were an open time and every even second (or millisecond) were a closed time, then a data packet sent to the network interface at a random time would be accepted with a probability of 50%. With only one millisecond of open time within each second, this probability drops to as low as 0.1%.

It has been found that in this way the network interface can be secured against infiltration of unauthorized messages with little effort. There are several conceivable sources for such unauthorized messages in a vehicle. For example, an additional device can be connected to the network, such as by physical intervention in a cable connection, by the use of an unused port on a distributor (such as a bridge), by using a diagnostic access, or replacing a device that is currently unused by an unauthorized device. For example, a device actually authorized on the network may also be infected with malware that causes the device to send additional messages at times other than those originally scheduled.

Furthermore, whenever there are multiple security domains that are not physically decoupled from each other, there is always a risk that messages from a less trustworthy security domain (such as a domain to which a networked infotainment system belongs) can be smuggled into a trusted security domain that is important for the operation of the vehicle (such as a domain to which an autonomous driving control unit belongs). The attack points in this regard are, for example, network components or devices connected to both security domains at the same time.

In all these cases, the attacker does not know the timetable of the open times. Therefore, it is useless for the attacker to somehow infiltrate the messages into the network, because they will be discarded by the network interface. This discarding can take place, in particular, purely based on the wrong transmission time without viewing the content, which is particularly advantageous from a security point of view. If, due to the wrong transmission time, the content of the message can already be assumed to be malicious, then any processing of that content carries the risk that malware contained in the content will overcome the processing logic through buffer overflows, deliberately improperly formulated messages, and similar attack techniques. If no such processing is carried out, the attacks will fail.

It is still possible to discard the messages without processing their content quickly and in hardware, without allowing limited resources (such as a maximum possible number of messages being processed at the same time) to be exhausted as in a denial of service attack.

It is also possible to detect the unauthorized complete replacement of a network node by another device and to block messages from that other device. For example, immobilizers currently implemented in engine control units are bypassed by replacing the entire control unit with a manipulated control unit that allows the vehicle to be started even without the original key. However, if, for example, during the assembly of the devices for a specific vehicle a monitoring unit is used to define a timetable as a secret known only to the engine control unit and the devices and actuators it addresses, then this secret will be missing in an unauthorized engine control unit. As a result, messages sent by the wrong engine control unit at the wrong time will be discarded, so that, for example, the starter ignores the command to activate it.

In principle, the same or a higher level of security could be achieved by cryptographic protection of the communication alone. However, this requires significantly higher computing power, which is not always available in control units for vehicles and other embedded systems. In addition, each message must first be cryptographically processed and checked, which creates new points of attack. The attacker is at least given the opportunity to submit messages to the cryptographic software that operates with high privileges. For example, the attacker could try to crash or even take control of the cryptographic software by means of messages deliberately formatted in non-conformant ways.

Closed times do not allow messages to be accepted, which reduces the overall available bandwidth averaged over the total time comprising all open times and all closed times. The division of the total time into open times and closed times is therefore based on both the desired bandwidth and latency and on the length of the messages to be transmitted. For example, larger data packets must be transmitted in an Ethernet network when high-volume data, such as video data or software updates, is to be transmitted.

Therefore, in an advantageous design the individual open times in the timetable are no longer than 150 µs and are separated by closed times of at least 1 ms duration. This represents a feasible compromise between security level, bandwidth, and latency for many vehicle applications.

In a particularly advantageous design, the network interface comprises at least one electrical or optical switching element that switches an electrical or optical path of signals presented at the input port to be physically transparent at the opening times and to be physically impermeable at the closed times. An example of an electrical switching element is a transistor, which can activate and deactivate the electrical path or a light source for the optical path. A MEMS mirror, which can be introduced into the optical path, can act as an optical switching element. The physical interruption of the electrical or optical path during the closed times cannot be overridden illegitimately by any malicious content that may be contained in the message.

This applies in particular in a further particularly advantageous design, in which at least one electrical or optical switching element is connected between the input port and a demodulator which decodes messages from the signals. An interruption by the switching element then immediately results in the prevention of any decoding of the potentially malicious message and this malicious content remaining inaccessible.

In a further particularly advantageous design, the configuration unit is designed to negotiate the timetable with a cryptographic public key protocol. For example, a Diffie-Hellman key exchange can be performed between the configuration unit and a sender from whom messages are to be received, which feeds into the creation of the timetable as a shared secret. The devices then authenticate each other by proving that they each possess the private key to a public key classified as trustworthy by the partner.

In this way, in particular, the mutual trust between devices can be organized in a decentralized manner. For example, two associated devices can be delivered from the factory in a state in which their public keys are mutually recognized as trustworthy. They can then negotiate a timetable directly after connecting to the network without further manual configuration, regardless of which other devices are present on the network. For example, a new device can only be selectively empowered to communicate only with certain other devices.

In another particularly advantageous design a detector is provided, which is designed to detect attempts to deliver messages at the input port during the closed times. Such messages may indicate network faults and, in particular if they continue to occur, an attack or unauthorized replacement of a device. Depending on how detailed the detector feedback is intended to be, the detector can be equipped with more or less functionality and implemented in hardware and/or software.

For example, if it is only a matter of detecting and reacting to a continuing arrival of messages during the closed times, it may be sufficient, for example, to register whether light or an electrical voltage is applied to the input port within the closed times. An influx of messages in the closed times above a certain tolerance threshold can then be determined, for example, by charging a capacitor by means of the light or the voltage. If the charge state of this capacitor exceeds a predefined threshold, it can be detected that an attack is underway. In the case of digital processing, for example, any message that arrives during a closed time can increment a counter.

If, on the other hand, more detailed information is to be collected and possibly also the source of the messages arriving during the closed times to be determined, the messages, or at least their headers, can be decoded. For this purpose, a software decoder can be used, for example. For example, a decoding circuit consisting of ASICs or other circuits that cannot be modified at runtime can be used to decode the desired information on the one hand, and to avoid being susceptible to corruption of the decoding process by malicious software on the other hand.

In a further particularly advantageous design, the configuration unit is additionally designed to request a new timetable from the configuration unit in response to one or more attempts detected by the detector, and/or to negotiate a new timetable with the at least one sender of messages, and/or to signal a manipulation attempt via an alarm output.

Replacing the current timetable with a new timetable fulfils the purpose of making it more difficult to discover the timetable, or else individual open times of this timetable, using systematic trial and error. Before the trial and error process has a sufficient likelihood of success, the timetable being sought is already replaced by a new one, and the trial and error process must start again.

For example, the reporting of manipulation attempts via an alarm output can be used to initiate countermeasures, such as disabling or restarting devices, or perhaps blocking messages from external networks by means of a firewall.

According to the above comments, at least the input port is designed for connection to an Ethernet network. As explained above, this can at least indirectly promote the use of Ethernet networks as on-board networks of vehicles. The increased security against unauthorized infiltration of messages significantly reduces the abstract security risk mainly caused by the free availability of knowledge and components for access to Ethernet networks.

Therefore, the invention also relates to a control unit, navigation system or entertainment system for a vehicle, with at least one instance of the network interface described above being provided for connection to an on-board network of the vehicle.

Another particularly advantageous design includes a security circuit that can be connected to the alarm output of the network interface. The security circuit is designed, in response to the signaling of a manipulation attempt via the alarm output, to block the functionality of a control unit, a navigation system and/or an entertainment system, to lock an immobilizer system of the vehicle, and/or to remove the vehicle from flowing traffic by activating a steering system, a drive system, and/or a braking system of the vehicle.

Thus, for example, a navigation system or entertainment system can be designed so as to work only if it receives messages from the vehicle control unit at certain intervals. These messages are only accepted by the network interface of the navigation system or entertainment system if they arrive during the open times of a secret timetable. If these messages no longer arrive, or if messages only arrive during closed times, this can be considered as a sign that the navigation system or entertainment system has been separated from its original home vehicle and transplanted into another vehicle. If this happens without the network interface timetable also being adjusted, it can be considered as an indication that the navigation system or entertainment system has been stolen from its home vehicle. The system can then be rendered unusable for the time being, for example by a lock in its firmware or by burning out a component required for its operation, and, in this state, it is worthless to a thief.

The immobilizer can also be protected in a similar way. For example, a unit that exercises the physical effect of the immobilizer, for example blocking the brakes or interrupting the fuel supply, and/or any other assembly required to start the vehicle, such as the starter motor or a pump for building up the hydraulic pressure in the automatic transmission, can be connected to the vehicle's engine control unit via its on-board network and only accept commands within specific open times.

If the vehicle is removed from the public transport system, this can be carried out, for example, via an emergency trajectory, such as is stored in the ESP control unit in at least partially automatically driven vehicles.

According to the above comments, the invention also relates to an onboard network for a vehicle. This on-board network comprises at least a first security domain and a second security domain, wherein the second security domain comprises subscribers that are assigned a higher level of trustworthiness than the subscribers to the first security domain, and/or the second security domain comprises subscribers which control or monitor functions important to the security of the vehicle as a whole. The on-board network comprises at least one instance of the described network interface, its input port being connected to the first security domain and the output port of the network interface being connected to the second security domain.

In this way, the forwarding of messages from the first security domain into the second security domain can be restricted to subscribers that know the network interface timetable. For example, controlling the flow of information based on the timetable can be focused on the transition between the two security domains, while timetables do not need to be maintained and monitored within the individual security domains. In this way, for example, it is possible to prevent sporadic malfunctions arising due to discarded messages as a result of the clocks drifting apart between different network subscribers.

Another way of sub-dividing networks into security zones or security groups is provided by a method for operating the previously described network interface or the previously described on-board network. In this method, the same network interface uses different timetables for messages received from at least two different senders. By modifying or deleting one of these timetables, it is possible to selectively deprive specific subscribers or groups of subscribers of the ability to deliver messages via the network interface. For example, the subscribers that use the same timetable to send to the same network interface can also use this timetable to communicate with each other.

Advantageously, at least one sender of messages performs an authentication with respect to the configuration unit, and/or the monitoring unit. The decision as to which timetable to use as the shared secret between the sender and the network interface depends on the success of the authentication. For example, it may be decided that if a sender is authenticated and acknowledged as trustworthy, a last-used timetable may continue to be used, while for unauthenticated and/or untrusted communication partners a new, separate timetable is used.

Thus, the decision as to which timetable is used as the shared secret of the sender and the network interface also advantageously depends on a trustworthiness status of the sender with respect to the configuration unit, and/or the monitoring unit. In this way, the access rights of, in particular, less trustworthy communication partners can be maximally restricted and if necessary, selectively withdrawn again without blocking the data traffic that is acknowledged as trustworthy.

Although the open times within the timetable are preferably short and may be less than 50 µs, for example, for non-high-volume transmissions over 100 Mbps Ethernet, the timetable as a whole can extend over periods from seconds up to hours. The timetable can also be repeated cyclically. The configuration unit, and/or the monitoring unit, advantageously provides the sender of messages with the time at which the timetable starts to run. This can ensure that the sender is synchronized with the receiving network interface, while at the same time the mere start time of the timetable does not betray any secrets and can therefore also be sent openly over the network.

Although many of the embodiments described implement additional security through the use of additional hardware, the functionality of the described network interface, a downstream functionality of a control unit, navigation system or entertainment system that takes advantage of the presence of this network interface, as well as the functionality of the described method, can be implemented either in full or in part in software. For example, this software can be distributed as an update or upgrade that works in combination with existing hardware. Therefore, the invention also relates to a program element with machine-readable instructions which, when they are executed on an embedded system of a network interface, upgrade the network interface to the network interface described;

when they are executed on a control unit, navigation system, or entertainment system, upgrade the control unit, navigation system, or entertainment system to the control unit, navigation system, or entertainment system described; and when they are executed on one or more computers, control units, or embedded systems, cause the computer or computers, control units, or embedded systems to execute the described method.

The invention also relates to a machine-readable data medium or a download product having the program element.

BRIEF DESCRIPTION OF THE DRAWINGS

The subject matter of the invention is explained in the following text based on figures, but without limiting the subject matter of the invention. In the drawings.

DETAILED DESCRIPTION

Figure 1:
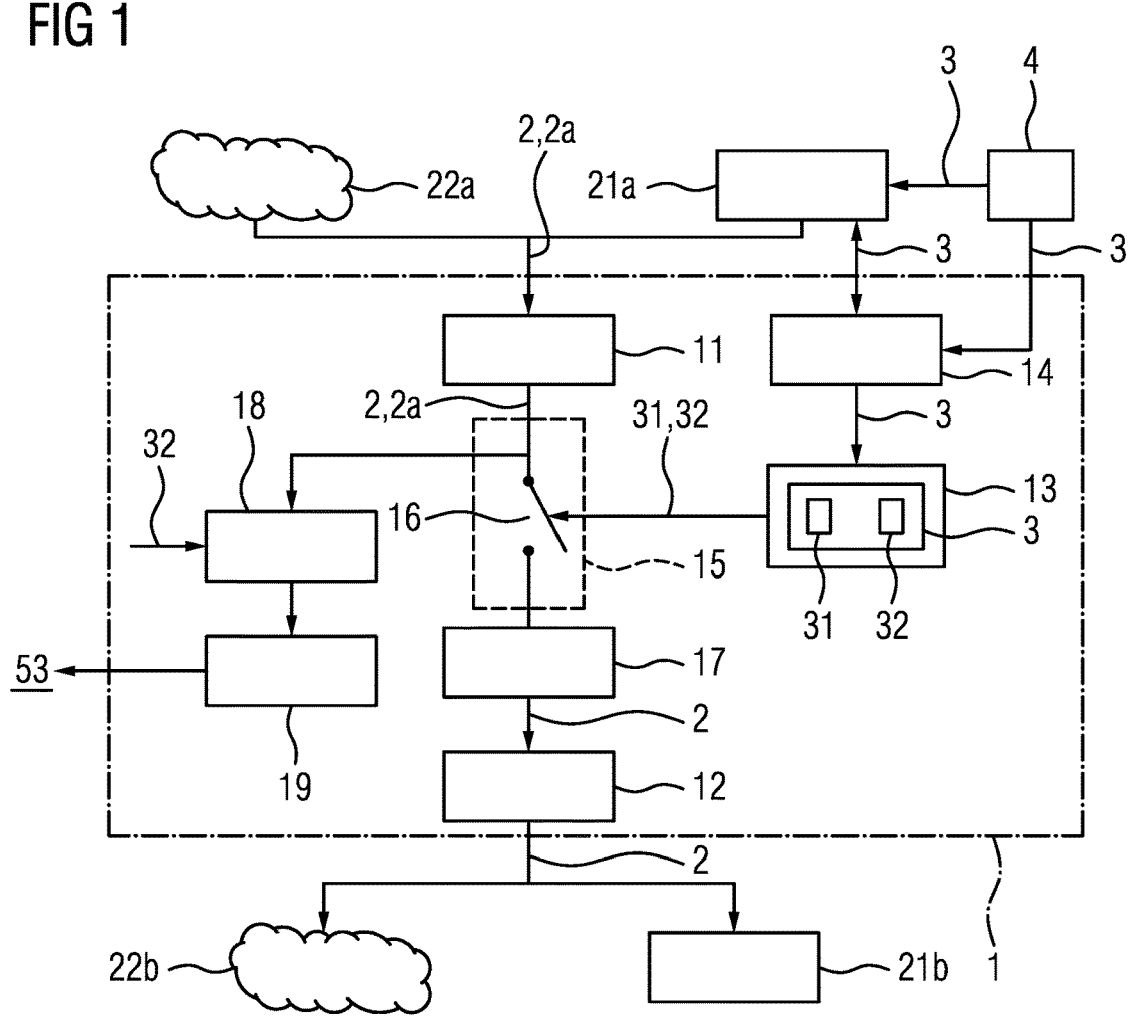
FIG. 1 shows an exemplary embodiment of the network interface 1.

According to FIG. 1, the network interface 1 has an input port 11, via which it receives messages 2 from a first device 21*a* or a first network 22*a*. The messages 2 are initially applied at the input port 11 as electrical or optical signals 2*a*. The messages 2 must first be decoded from the signals using a demodulator 17 before their content can be processed further. From the demodulator 17, the decoded messages 2 are routed to the output port 12 of the network interface 1. From there, the messages 2 reach their recipients, here, for example, a second device 21*b* or a second network 22*b*.

An electrical or optical switching element 16 is connected in the electrical or optical path 15 between the input port 11 and the demodulator 17. This switching element 16 is controlled on the basis of a timetable 3, which is stored in a memory 13 of the network interface 1. In the open times 31 of the timetable 3, the switching element 16 is switched to be transparent to the signals 2*a*. In the closed times 32 of the timetable 3, the switching element 16 is switched to be impermeable to the signals 2*a*. Thus, the end result is that messages 2 arriving during the open times 31 of the timetable 3 are forwarded to their recipients 21*b*, 22*b*, while messages 2 received during the closed times 32 of the timetable 3 are discarded. The discarded messages 2 do not even reach the demodulator 17 at all and are therefore not decoded at all, so there is no possibility whatsoever of an attacker taking control of any component of the network interface 1 using malware of any kind in a message 2.

This security is based on the fact that the timetable 3 is a shared secret of the network interface 1, on the one hand, and the authorized senders 21*a*, 22*a* on the other. FIG. 1 shows two examples of ways of reaching the state in which the shared secret is present in both the first device 21*a* and the network interface 1. The configuration unit 14 of the network interface 1 can negotiate the timetable 3 directly with the first device 21*a*, for example using a public key protocol. However, the timetable can also be transmitted, for example by a monitoring unit 4, to both the first device 21*a* and to the configuration unit 14. As shown in the examples of FIG. 1, the monitoring unit 4 can reside outside of the network interface 1. However, the monitoring unit 4 can be equally well positioned within the network interface 1.

In the network interface 1, a detector 18 is also provided, which is informed about the closed times 32 and checks whether messages 2 arrive at the input port 11 during this time (i.e. whether signals 2*a* are present there). If this is the case, an attempted manipulation can be signaled via the alarm output 19. For example, this message can be further processed by a downstream security circuit 53 and actions can be initiated to contain the effects of the attack.

Figure 2:
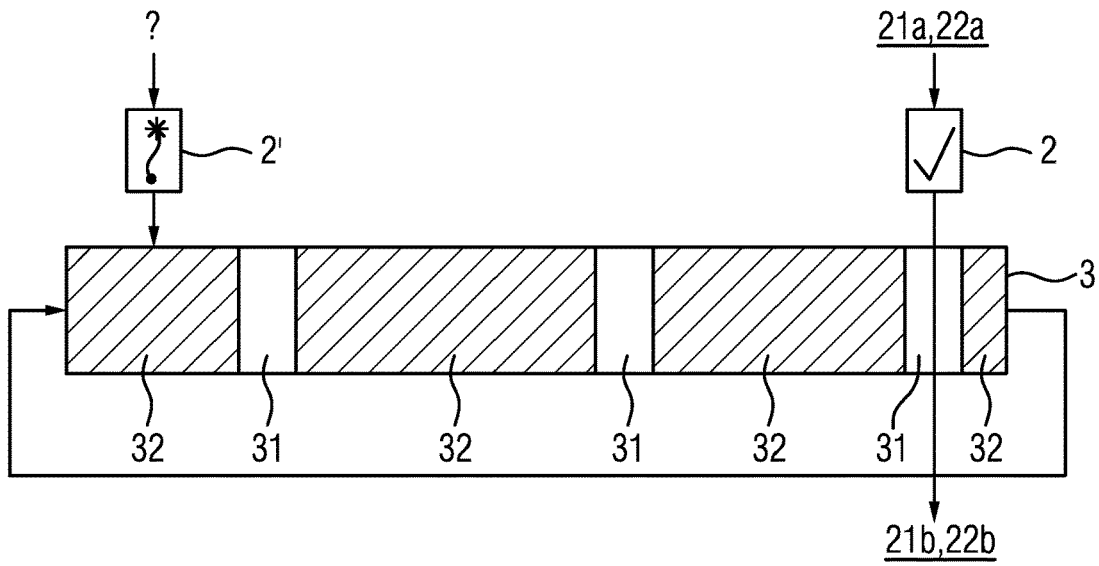
FIG. 2 shows an exemplary effect of the timetable 3.

FIG. 2 schematically shows how the timetable 3 can be used to defend against attacks. A malicious message 2' from an unknown sender, symbolized by the question mark, who does not know the timetable 3, is highly likely to arrive during a closed time 32 and is not forwarded to the recipient 21*b*, 22*b*. A benign message 2 from an authorized sender 21*a*, 22*a*, on the other hand, arrives during an open time 31 and reaches the recipient 21*b*, 22*b*.

Figure 3:
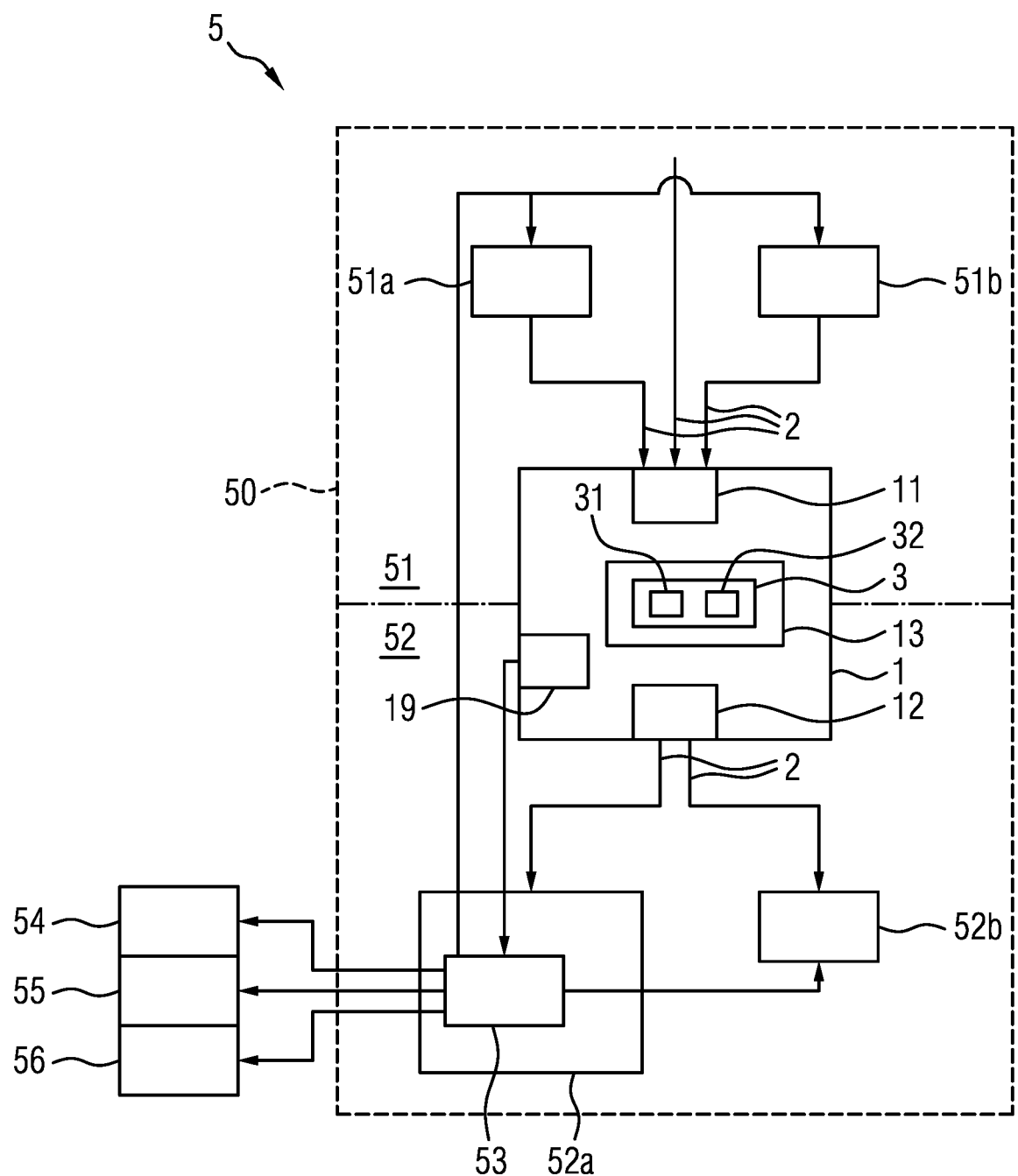
FIG. 3 shows an exemplary use of the network interface 1 in a vehicle 5 with a network 50.

FIG. 3 shows the exemplary application of the network interface 1 in an on-board network 50 of a vehicle 5. In this example, the onboard network 50 is divided into two security domains 51 and 52. In the first, less trustworthy security domain 51, less critical systems are located, here a navigation system 51*a* and an entertainment system 51*b*, for example. These systems are also comparatively susceptible to attacks because they typically accept user inputs or digital data (such as street maps or media files). In the second, more trustworthy security domain 52, important systems for the security of the vehicle are located, here a control unit 52*a* and an immobilizer 52*b*, for example. Data traffic from the first security domain 51 to the second security domain 52 is only possible through the network interface 1. The network interface 1 is connected via its input port 11 to the first security domain 1 and via its output port 12 to the second security domain 52.

For example, it may now be provided that certain messages 2 are forwarded from the first security domain 51 to the second security domain 52. Driving assistance systems, for example, benefit from this when they are informed by the navigation system 51*a* about which route the driver of the vehicle 5 has planned. Similarly, the controls of the entertainment system 51*b* can be used to specify that the automatic transmission should only shift up to third gear, so that the engine braking can be used on a downhill slope. These authorized messages 2 arrive during the open times 31 of the timetable 3 stored in the memory 13 of the network interface 1 and are forwarded to their respective recipients.

If, on the other hand, the navigation system 51*a* or the entertainment system 51*b* is compromised by malware, or if an attacker otherwise gains access to the first security domain 51, unauthorized incoming messages (2' in FIG. 2) are highly likely to arrive during the closed times 32 and will not be forwarded. Instead, the occurrence of such messages 2' can be signaled to the security circuit 53 of the control unit 52*a* via the alarm output 19 of the network interface 1. The security circuit 53 can then block the functionality of the navigation system 51*a* or the entertainment system 51*b*, for example, or lock the immobilizer system 52*a*. In addition, the security circuit 53 can, for example, remove the vehicle 5 from the flowing traffic by controlling the steering system 54, the drive system 55, and/or the braking system 56.

Figure 4:
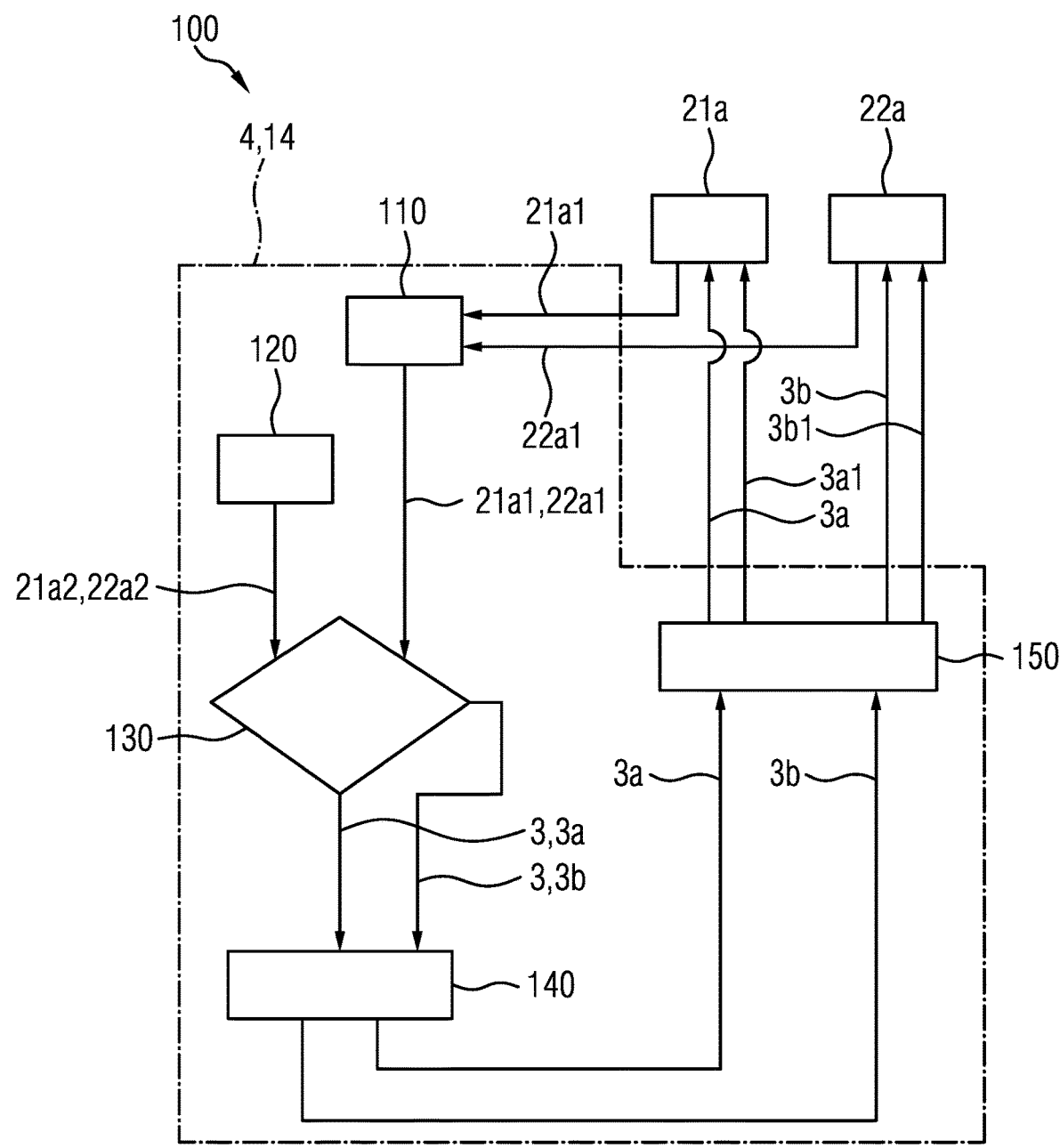
FIG. 4 shows an exemplary embodiment of the method 100.

FIG. 4 shows an exemplary embodiment of the method 100. In step 110, different senders 21*a*, 22*a* of messages 2 perform an authentication 21*a*1 or 22*a*1 with respect to the configuration unit 14, and/or the monitoring unit 4. In step 120, the trustworthiness status 21*a*2, or 22*a*2, of the senders 21*a* and 22*a* is determined. This is used together with the result of the respective authentication 21*a*1, or 22*a*1, for the decision 130 as to which timetables 3, 3*a*, 3*b* are assigned to the senders 21*a* and 22*a* in each case.

The assigned timetables 3, 3*a*, 3*b* are transmitted to the corresponding senders 21*a*, 22*a* in step 140. In the example shown in FIG. 4, timetable 3*a* is assigned to the first sender 21*a* and timetable 3*b* is assigned to the second sender 22*a*. In addition, the senders 21*a* and 22*a* are also informed in step 150 of the respective start time 3*a*1, or 3*b*1, of the respective timetable 3*a* or 3*b*. This start time 3*a*1 or 3*b*1 is not identical to the start of the respective first open time 31, i.e., both timetables 3*a* and 3*b* each start with a closed time 32.

The invention claimed is:

1. A network interface comprising:
   an input port configured to receive messages from a first device or first network;
   an output port configured to forward the messages to a second device or second network,
   a memory configured for storing a timetable,
   wherein the network interface is configured to:
      forward messages arriving at the input port, during open times defined by the timetable, to the output port, and
      discard messages arriving at the input port, during closed times defined by the timetable;
   a configuration unit configured to:

receive and store in the memory a timetable that is defined by a monitoring unit as a shared secret for the network interface and at least one sender of messages, and/or negotiate a timetable with at least one sender of messages as a shared secret;

a detector configured to detect attempts to deliver messages at the input port during the closed times; and wherein the configuration unit is configured to:
request a new timetable from the configuration unit in response to one or more attempts detected by the detector, and/or negotiate a new timetable with the at least one sender of messages, and/or report an attempt at manipulation via an alarm output.

2. The network interface as claimed in claim 1, comprising at least one electrical or optical switching element, which switches an electrical or optical path of signals presented at the input port to be physically transparent at the open times and to be physically impermeable at the closed times.

3. The network interface as claimed in claim 2, wherein at least one electrical or optical switching element is connected between the input port and a demodulator which decodes messages from the signals.

4. The network interface as claimed in claim 1, wherein the configuration unit is designed to negotiate the timetable with a cryptographic public key protocol.

5. The network interface as claimed in claim 1, wherein the individual open times in the timetable are no longer than 150 μs and are separated by closed times of at least 1 ms duration.

6. The network interface as claimed in claim 1, wherein at least the input port is designed for connection to an Ethernet network.

7. At least one of a control unit, a navigation system, and an entertainment system for a vehicle, having at least one network interface for connection to an on-board network of the vehicle, the at least one network interface comprising:
an input port configured to receive messages from a first device or first network;
an output port configured to forward the messages to a second device or second network,
a memory configured for storing a timetable,
wherein the network interface is configured to:
forward messages arriving at the input port, during open times defined by the timetable, to the output port, and
discard messages arriving at the input port, during closed times defined by the timetable;
a configuration unit configured to:
receive and store in the memory a timetable that is defined by a monitoring unit as a shared secret for the network interface and at least one sender of messages, and/or
negotiate a timetable with at least one sender of messages as a shared secret;
a detector configured to detect attempts to deliver messages at the input port during the closed times; and
wherein the configuration unit is configured to:
request a new timetable from the configuration unit in response to one or more attempts detected by the detector, and/or
negotiate a new timetable with the at least one sender of messages, and/or
report an attempt at manipulation via an alarm output.

8. The at least one of a control unit, a navigation system, and an entertainment system as claimed in claim 7, comprising:
a security circuit configured to be connected to the alarm output of the network interface,
wherein the security circuit is configured to, in response to the signalling of a manipulation attempt via the alarm output:
block the functionality of a control unit, a navigation system and/or an entertainment system,
lock an immobilizer system of the vehicle, and/or
remove the vehicle from flowing traffic by activating a steering system, a drive system, and/or a braking system of the vehicle.

9. An on-board network for a vehicle, comprising:
a first security domain;
a second security domain, wherein the second security domain comprises subscribers that are assigned a higher level of trustworthiness than the subscribers of the first security domain, and/or wherein the second security domain comprises subscribers which control or monitor functions important to the security of the vehicle as a whole,
a network interface, which is connected to the first security domain via an input port and to the second security domain via an output port, the at least one network interface comprising:
the input port, which is configured to receive messages from a first device or first network, and
the output port, which is configured to forward the messages to a second device or second network,
wherein a memory is provided for a timetable,
wherein the network interface is configured to:
forward messages arriving at the input port during open times, which are defined by the timetable, to the output port, and
discard messages arriving at the input port during closed times, which are defined by the timetable,
a configuration unit that is configured to
receive and store in the memory a timetable, which is defined by a monitoring unit as a shared secret for the network interface and at least one sender of messages, and/or
negotiate a timetable with at least one sender of messages as a shared secret;
a detector that is configured to detect attempts to deliver messages at the input port during the closed times; and
wherein the configuration unit is additionally configured to:
request a new timetable from the configuration unit in response to one or more attempts detected by the detector, and
negotiate a new timetable with the at least one sender of messages.

10. A method for operating at least one of a network interface and an on-board network, wherein a network interface uses different timetables for messages arriving from at least two different senders, the network interface comprising:
an input port, which is configured to receive messages from a first device or first network;
an output port, which is configured to forward the messages to a second device or second network;
a memory configured to store a timetable;
wherein the network interface is configured to:

forward messages arriving at the input port during open times, which are defined by the timetable, to the output port, and discard messages arriving at the input port during closed times, which are defined by the timetable;

a configuration unit that is configured to:

receive and store in the memory a timetable, which is defined by a monitoring unit as a shared secret for the network interface and at least one sender of messages, and/or negotiate a timetable with at least one sender of messages as a shared secret;

a detector that is configured to detect attempts to deliver messages at the input port during the closed times; and wherein the configuration unit is additionally configured to:

request a new timetable from the configuration unit in response to one or more attempts detected by the detector, and negotiate a new timetable with the at least one sender of messages.

11. The method as claimed in claim 10, wherein at least one sender of messages performs an authentication with respect to the configuration unit, and/or with respect to the monitoring unit, and wherein the decision as to which timetable is used as the shared secret of the sender and the network interface depends on the outcome of the authentication.

12. The method as claimed in claim 11, wherein the decision as to which timetable is used as the shared secret of the sender and the network interface additionally depends on a trustworthiness status of the sender with respect to the configuration unit and/or the monitoring unit.

13. The method as claimed in claim 12, wherein the configuration unit and/or the monitoring unit transmits to the sender of messages the time at which the timetable begins to run.

* * * * *